No. 648,799. Patented May 1, 1900.
C. A. SCADDING.
WATER PURIFIER.
(Application filed July 28, 1899.)
(No Model.)

WITNESSES:
William P. Gaebel
Geo. J. Hoster

INVENTOR
C. A. Scadding
BY
Munn & Co.
ATTORNEYS

UNITED STATES PATENT OFFICE.

CHARLES A. SCADDING, OF BUFFALO, NEW YORK.

WATER-PURIFIER.

SPECIFICATION forming part of Letters Patent No. 648,799, dated May 1, 1900.

Application filed July 28, 1899. Serial No. 725,388. (No model.)

*To all whom it may concern:*

Be it known that I, CHARLES ALFRED SCADDING, of Buffalo, in the county of Erie and State of New York, have invented a new and Improved Water-Purifier, of which the following is a full, clear, and exact description.

The object of the invention is to provide a new and improved water-purifier, more especially designed for use in boiling water contained in kettles and other vessels and arranged to collect and store the impurities and to permit of placing it in position or removing it from the kettle for cleaning or other purposes.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the figures.

Figure 1:
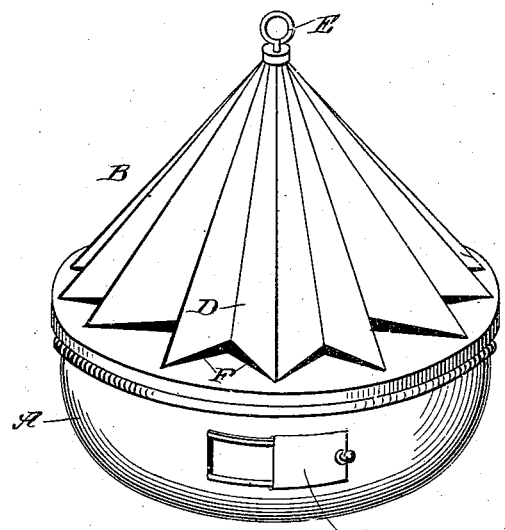
Figure 2:
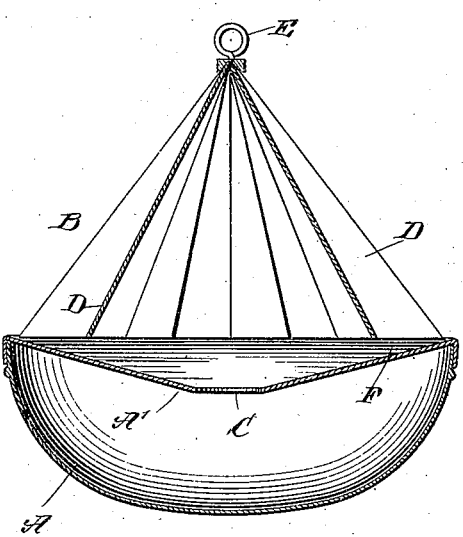

Figure 1 is a perspective view of the improvement, and Fig. 2 is a sectional side elevation of the same.

The improved water-purifier consists, essentially, of a floatable vessel A and a collector B, arranged on the dished top A' of said vessel A. The dished top A' of the vessel is provided at its middle or apex with an opening C for allowing the impurities collected by the collector B and discharged upon said dished top A' to flow into the interior of the vessel A and be stored therein. The collector B is in the form of a pyramid having fluted sides D, a ring E being on the apex for the application of a hook or other tool to place the purifier in the kettle or other vessel or to remove it therefrom whenever it is desired to do so for cleaning the vessel A of its impurities or for other purposes. The lower ends of the fluted sides D of the collector terminate above the dished top A' of the vessel, as shown at F, so that any impurities gathered by the sides D readily flow down the same to be discharged upon the top A, from which the impurities flow inward through the opening C to finally land in the vessel A.

On one side of the vessel A is a suitable door G normally closed, but adapted to be opened for removing the accumulated impurities from the vessel A.

The collector B is preferably made hollow and adds stability to the vessel A, so that water when boiling is not liable to upset the device and the water spraying upon the fluted sides of the collector B readily delivers its impurities to the sides.

Having thus fully described my invention, I claim as new and desire to secure by Letters Patent—

1. A water-purifier, comprising a floatable vessel having a top, and a fluted collector on said top and having its lower ends terminating above said top whereby to form passages for the impurities to pass over the top into the vessel, as set forth.

2. A water-purifier, comprising a floatable vessel, and a collector on the top of said vessel, said collector being in the form of a pyramid having fluted sides, as set forth.

3. A water-purifier, comprising a floatable vessel having a dished top with an aperture at the apex, and a collector on said top and in the form of a hollow pyramid having fluted sides, the lower ends of which terminate above said top, to form passages for the impurities gathered by the sides, to allow the impurities to pass over the top into the vessel, as set forth.

4. A water-purifier, comprising a floatable vessel having a dished top with an aperture at the apex, a collector on said top and in the form of a hollow pyramid having fluted sides, the lower ends of which terminate above said top, to form passages for the impurities gathered by the sides, to allow the impurities to pass over the top into the vessel, and a cleaning-door in the side of the vessel, as set forth.

5. A water-purifier, comprising a floatable vessel having a dished top with an aperture at the apex, a collector on said top and in the form of a hollow pyramid having fluted sides, the lower ends of which terminate above said top, to form passages for the impurities gathered by the sides, to allow the impurities to pass over the top into the vessel, and a ring in the apex of said collector, as set forth.

CHARLES A. SCADDING.

Witnesses:
EDWIN M. FREAKLEY,
SARAH FREAKLEY.